United States Patent [19]

Simpson

[11] 4,255,174

[45] Mar. 10, 1981

[54] SEPARATOR

[75] Inventor: Trevor W. Simpson, North Watford, England

[73] Assignee: Rolls-Royce Limited, London, England

[21] Appl. No.: 79,257

[22] Filed: Sep. 27, 1979

[30] Foreign Application Priority Data

Nov. 28, 1978 [GB] United Kingdom .............. 46429/78

[51] Int. Cl.³ .............................................. B01D 45/12
[52] U.S. Cl. ........................................ 55/347; 55/306; 55/396; 55/424; 55/435; 55/457; 55/DIG. 25
[58] Field of Search ................. 55/306, 347, 392, 396, 55/407, 424, 428, 435, 456, 457, 466, DIG. 25, 426

[56] References Cited

U.S. PATENT DOCUMENTS

| | | | |
|---|---|---|---|
| 1,372,714 | 3/1921 | Milliken | 55/347 |
| 1,866,663 | 7/1932 | Morris | 55/457 |
| 2,348,785 | 5/1944 | Bullock | 55/347 |
| 3,448,563 | 6/1969 | Sobeck | 55/347 |
| 3,748,832 | 7/1973 | Furlong et al. | 55/424 |
| 3,825,212 | 7/1974 | Darges et al. | 55/457 |
| 3,885,935 | 5/1975 | Nutter | 55/424 |
| 3,955,948 | 5/1976 | Campolong | 55/426 |
| 4,157,250 | 6/1979 | Regehr et al. | 55/424 |

*Primary Examiner*—David L. Lacey
*Attorney, Agent, or Firm*—Cushman, Darby & Cushman

[57] ABSTRACT

Jet engines can function properly even in conditions where liquid droplets are taken in by the compressor of the engine. However, where the droplets contain corrosive substances such as salts, damage can accrue not only through corrosion, but through build up of deposits spoiling the aerodynamic flow of air and gas through the engine. The risk of this ocurring is reduced by placing a vaned vortex generator in the intake and including on the flanks of its vanes, grooves which collect the droplets into coalesced streams and directs them to an area adjacent the intake wall. A flow splitter provides an annular, secondary outlet to dump the concentrated fluids.

10 Claims, 3 Drawing Figures

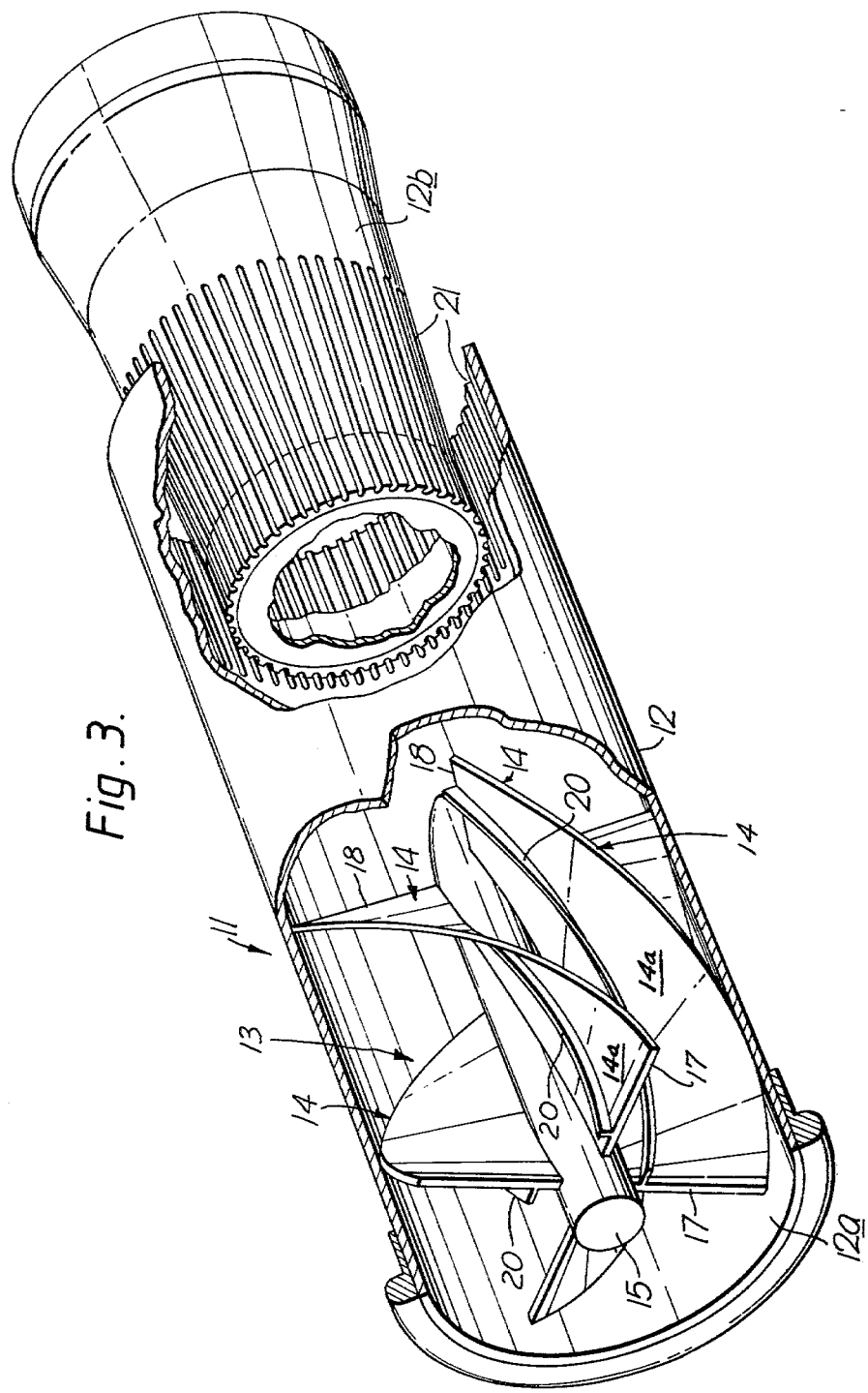

SEPARATOR

This invention relates to separators and in particular to separators suitable for separating liquid droplets from a gas stream.

It is frequently desirable to separate liquid droplets from a gas stream if those droplets are detrimental in any way to the function served by that gas stream. For instance, the engines of helicopters adapted to operate in marine environments are prone to the ingestion of sea water spray. This is particularly troublesome in the case of gas turbine engine powered helicopters. In addition to causing corrosion problems, the sea water spray can, if it is of a sufficiently high concentration, cause the build up of various salt deposits on the compressor of the engine. If these deposits become sufficiently thick, the efficiency of the compressor, and in turn the engine is inevitably impaired. Engine power losses result which, in extreme cases, may be so great as to provide a serious threat to the safety of the helicopter and its crew.

It is an object of the present invention to provide a separator suitable for separating at least some liquid droplets from a liquid droplet carrying gas stream.

According to the present invention, a separator suitable for separating liquid droplets from a liquid droplet carrying gas stream comprises a substantially circular cross-section primary duct containing vaned means adapted to induce any liquid droplet carrying gas stream passing through said primary duct into a vortex about the axis of said duct and to provide at least one surface upon which some of said liquid droplets will impinge and coalesce, said vaned means being adapted to direct any such coalesced liquid to the radially outer regions of said primary duct whereby any gas stream exhausted from the radially inner regions of said primary duct will have a reduced liquid droplet concentration or be substantially liquid droplet free.

Said at least one surface of said vaned means may be provided with a plurality of grooves, adapted to direct coalesced liquid to the radially outer regions of said primary duct.

Alternatively said at least one surface of said vaned means may be provided with at least one fence adapted to direct coalesced liquid to the radially outer regions of said primary duct.

Said vaned means may comprise a plurality of vanes mounted on a common support member positioned along the longitudinal axes of said primary duct, said vanes extending between said support member and the internal wall of said primary duct.

Preferably means are provided downstream of said vaned means which means are adapted to split any gas stream exhausted from the radially inner regions of said primary duct from any gas stream exhausted from the radially outer regions of said primary duct.

Said gas stream splitting means preferably comprises a secondary duct having an end portion of frusto conical form, the smaller diameter end of said frusto conical end portion being positioned within said primary duct and adjacent the downstream end of said vaned means.

The radially outer surface of said secondary duct and the radially inner surface of said primary duct downstream of said vaned means may each be provided with means adapted to break up any of said coalesced liquid into droplets.

Said means adapted to break up said coalesced liquid into droplets may comprise a plurality of axial grooves.

Said separator may comprise one of a plurality of similar separators grouped together in support means and provided with a common drain for liquid separated from said gas stream.

The invention will now be described, by way of example, with reference to the accompanying drawings in which:

FIG. 3 is a sectioned perspective view of an alternative form of separator to that shown in FIG. 2.

Figure 1:
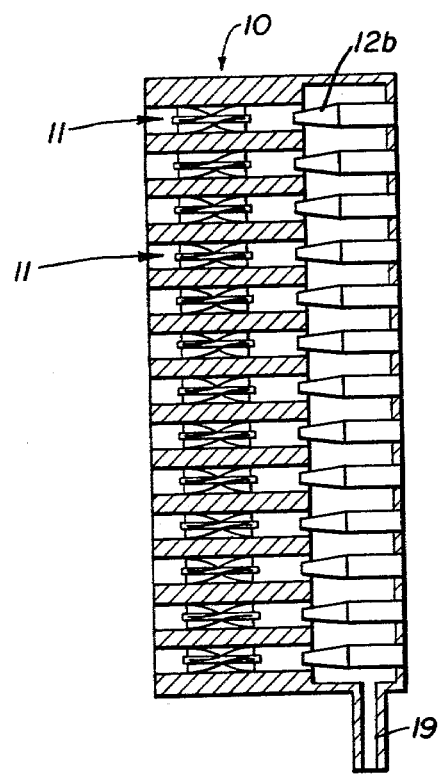
FIG. 1 is a sectioned side view of a bank of separators in accordance with the present invention mounted in a support frame.
Figure 2:
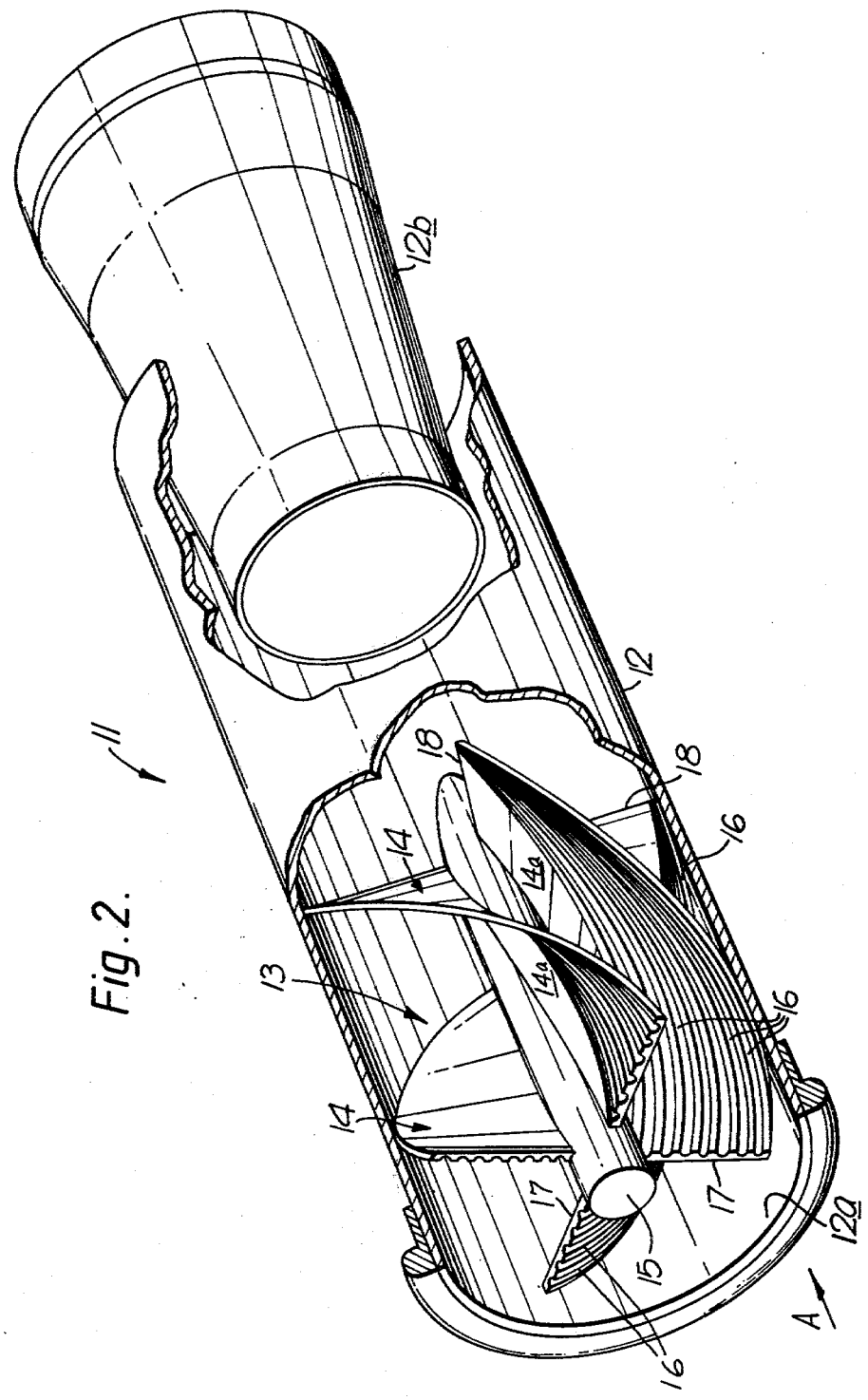
FIG. 2 is a sectioned perspective view of one of the separators shown in FIG. 1.

With reference to FIG. 1, a support frame generally designated at 10 supports a bank of similar separators 11, one of which can be more easily seen in FIG. 2.

The separator 11 comprises a circular cross-section primary duct 12 which contains a vaned structure generally designated at 13. The vaned structure 13 is made up of four vanes 14 which are mounted on a common support member 15. Although in this particular example four vanes have been employed, it will be appreciated that in certain circumstances, different numbers of vanes may be necessary. The support member 15 is generally cylindrical in form and positioned along the axis of the primary duct 12. The vanes 14 extend between the support member 15 and the internal wall 12a of the primary duct 12 so as to maintain the support member 15 in position along the axis of the primary duct 12. The vanes 14 are so shaped that any gas stream passing through the primary duct 12 in the direction indicated by arrow A will be induced into a vortex about the axis of the primary duct 12.

Each vane 14 is provided on one of its faces 14a with a series of adjacent grooves 16 which extend in a generally axial direction. More specifically, the grooves 16 are equally spaced apart along the leading edge 17 of the vane 14 and extend to the radially outer region of the trailing edge 18 of the vane 14. The arrangement is such that any liquid droplets carried by the gas stream flowing through the primary duct 12 will be centrifugally urged by the vortex motion of the gas stream in a generally radial direction. Some of the droplets will be urged to the radially outer reaches of the primary duct 12 while the remainder will impinge upon the vanes 14. The impinging liquid droplets will coalesce on the vanes 14 and be directed to the radially outer reaches of the primary duct 12 by the grooves 16. Consequently the gas stream exhausted from the radially outer regions of the duct 12 will have a high liquid concentration and the other exhausted from the radially inner regions of the duct will have a reduced liquid concentration or will be substantially liquid droplet free.

In order to split these two gas stream portions, a secondary duct 12b is positioned downstream of the vaned structure 13. The end of the secondary duct 12b is of frusto conical form with its smaller diameter portion positioned within the primary duct 12 and adjacent the downstream end of the vaned structure 13. Thus the gas stream portion which has a low liquid concentration or is liquid free will pass into the secondary duct 12b while the remaining portion having a high liquid concentration will pass around the outside of the secondary duct 12b.

Referring back to FIG. 1 the gas flow having a reduced or eliminated liquid droplet content will emerge from the secondary duct 12b and pass out of the support frame 10. The gas flow having a high liquid concentration will, however, exhaust into the support frame 10 where the liquid is removed through a drain 19.

In the separator 11 shown in FIG. 3, the grooves 16 on the face 14a of each vane 14 have been replaced by a single fence 20. Thus each vane 14 is provided with a single fence 20 which extends along the face 14a from the radially inner region of the leading edge 17 to the radially outer region of the trailing edge 18 of the vane 14. The fences 20 function in a similar fashion to the grooves 16 in that they direct coalesced liquid to the radially outer reaches of the primary duct 12.

Although the present invention has been described with reference to vanes 14 provided with adjacent grooves 16 or fences 20 on one of its faces 14a it will be appreciated that they could also be provided on both faces of each vane 14.

In order to break up the liquid emerging from the radially outer reaches of the vaned structure 13 into droplets, the radially outer surface of the frusto conical end portion of the secondary duct 12b and the radially inner surface of the primary duct 12 downstream of the vaned structure 13 may each be provided with a plurality of axial grooves 21 (FIG. 3). By breaking the liquid down into droplet form in this manner, more efficient liquid dispersal is achieved. It will be appreciated, however, that other suitable formations could be provided in order to achieve the same result.

The support frame 10 and its associated separators 11 and secondary ducts 12b may be utilized for instance in separating sea water spray from air passing into the engine inlets of helicopters adapted to operate in marine environments. The support frame 10 could be conveniently located in front of a helicopter engine inlet with the secondary ducts 12b positioned so as to direct air having a low or zero sea water spray content into the engine inlet.

I claim:

1. A separator suitable for separating liquid droplets from a liquid droplet carrying gas stream comprising:
  a substantially circular cross-sectional primary duct; and
  vaned means positioned within said primary duct for causing any liquid droplet carrying gas stream passing in operation through said primary duct into a vortex about the axis of said primary duct, said vaned means including at least one vane upon which at least some of said liquid droplets of said liquid droplet carrying gas stream impinge and coalesce, said at least one vane having a leading edge and a trailing edge with respect to said gas stream passing through said primary duct, said at least one vane additionally having a liquid droplet and coalesced liquid directing means on at least one surface thereof interconnecting at least a radially inner region of said leading edge with a radially outer region of said trailing edge, said directing means causing liquid droplets and coalesce liquid to be directed to said radially outer region of said primary duct so that the gas stream exhausted from the radially inner region of said primary duct has a reduced droplet concentration or is substantially liquid droplet free.

2. A separator as claimed in claim 1 wherein said vaned means comprises a plurality of vanes mounted on a common support member positioned along the longitudinal axis of said primary duct, said vanes extending between said support member and the internal wall of said primary duct.

3. A separator as claimed in claim 1 wherein means are provided downstream of said vaned means which means are adapted to split any gas stream exhausted from the radially inner regions of said primary duct from any gas stream exhausted from the radially outer regions of said primary duct.

4. A separator as claimed in claim 3 wherein said gas stream splitting means comprises a secondary duct having an end portion of frusto conical form, the smaller diameter end of said frusto conical end portion being positioned within said primary duct and adjacent the downstream end of said vaned means.

5. A separator as claimed in claim 4 wherein the radially outer surface of said secondary duct and the radially inner surface of said primary duct downstream of said vaned means are each provided with means adapted to break up any of said coalesced liquid into droplets.

6. A separator as claimed in claim 5 wherein said means adapted to break up said coalesced liquid into droplets comprises a plurality of axial grooves.

7. A separator device comprising a plurality as claimed in claim 1 of said separator wherein said separators are grouped together in support means and provided with a common drain for liquid separated from said gas stream.

8. A separator as claimed in claim 1 wherein said directing means interconnecting said trailing and leading edges of said at least one vane comprises a plurality of grooves on the at least one surface thereof.

9. A separator as claimed in claim 8 wherein said plurality of grooves are equally spaced along said leading edge from said radially inner region of the same and all extend to the radially outer region of said trailing edge of said at least one vane.

10. A separator as claimed in claim 1 wherein said directing means interconnecting the leading and trailing edges of said at least one vane comprise at least one fence extending from the inner region of the leading edge to the outer region of the trailing edge of said at least one vane.

* * * * *